United States Patent
Rakshit et al.

(10) Patent No.: US 11,308,697 B2
(45) Date of Patent: Apr. 19, 2022

(54) VIRTUAL REALITY BASED SELECTIVE AUTOMATION ADOPTION

(71) Applicant: International Business Machines Corporation, Armonk, NY (US)

(72) Inventors: Sarbajit K. Rakshit, Kolkata (IN); Krishna Koley, Kolkata (IN); Disha Maitra, Kolkata (IN); Ananya Pal, Hindmotor (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/569,363

(22) Filed: Sep. 12, 2019

(65) Prior Publication Data

US 2021/0082186 A1  Mar. 18, 2021

(51) Int. Cl.
| | |
|---|---|
| G06T 19/00 | (2011.01) |
| H04L 12/28 | (2006.01) |
| A63F 13/65 | (2014.01) |
| G06K 19/077 | (2006.01) |
| G06F 1/16 | (2006.01) |

(52) U.S. Cl.
CPC .......... *G06T 19/006* (2013.01); *A63F 13/65* (2014.09); *G06K 19/077* (2013.01); *H04L 12/283* (2013.01); *G06F 1/163* (2013.01)

(58) Field of Classification Search
CPC ............................ H04L 12/283; G06T 19/006
See application file for complete search history.

(56) References Cited

U.S. PATENT DOCUMENTS

| | | | |
|---|---|---|---|
| 8,635,544 B2* | 1/2014 | Kim | G06F 3/0488 715/764 |
| 9,922,580 B2 | 3/2018 | Mathews | |
| 10,163,198 B2 | 12/2018 | Rochford | |
| 10,173,136 B1* | 1/2019 | Hancock | A63F 13/79 |
| 10,210,767 B2 | 2/2019 | Johansen | |
| 10,217,375 B2 | 2/2019 | Waldron | |

(Continued)

FOREIGN PATENT DOCUMENTS

| | | |
|---|---|---|
| CN | 105117931 A | 12/2015 |
| CN | 107317822 A | 11/2017 |
| WO | 2018090713 A1 | 5/2018 |

OTHER PUBLICATIONS

"Augmented Reality Home Automation," Digitech, Sep. 10, 2016, 2 pages, <https://digitechcustom.net/augmented-reality-home-automation/>.

(Continued)

*Primary Examiner* — Ryan R Yang
(74) *Attorney, Agent, or Firm* — Daniel M. Yeates; Jay Wahlquist

(57) ABSTRACT

One example of a computer-implemented method comprises analyzing data received from an automation control device to identify a plurality of automation devices communicatively coupled to the automation control device; determining a functionality of at least one of the plurality of automation devices not utilized by the user; presenting a gamification scenario associated with the determined functionality to a user in a virtual reality environment; monitoring interaction of the user with the gamification scenario; and enabling use of the determined functionality based on the monitored interaction of the user with the gamification scenario.

20 Claims, 3 Drawing Sheets

(56) References Cited

U.S. PATENT DOCUMENTS

| | | | |
|---|---|---|---|
| 10,345,767 B2* | 7/2019 | Li | G05B 15/02 |
| 10,389,982 B1* | 8/2019 | Fu | G08B 13/1481 |
| 2003/0109270 A1* | 6/2003 | Shorty | H04L 12/2803 |
| | | | 455/517 |
| 2007/0156256 A1* | 7/2007 | Jung | G05B 15/02 |
| | | | 700/19 |
| 2008/0238667 A1* | 10/2008 | Olson | G06K 19/07762 |
| | | | 340/541 |
| 2009/0082879 A1* | 3/2009 | Dooley | B25J 9/0084 |
| | | | 700/3 |
| 2014/0179408 A1* | 6/2014 | Ducheneaut | A63F 13/65 |
| | | | 463/23 |
| 2016/0028605 A1* | 1/2016 | Gil | H04W 4/38 |
| | | | 709/213 |
| 2016/0055422 A1* | 2/2016 | Li | G05B 15/02 |
| | | | 706/12 |
| 2016/0080166 A1* | 3/2016 | Chen | H04L 12/2827 |
| | | | 700/276 |
| 2016/0110437 A1* | 4/2016 | Patel | G06F 16/26 |
| | | | 707/722 |
| 2016/0140257 A1* | 5/2016 | Vega | G06F 30/13 |
| | | | 703/1 |
| 2016/0232201 A1* | 8/2016 | Goran | G06N 20/00 |
| 2017/0033944 A1* | 2/2017 | Nadathur | G05B 15/02 |
| 2017/0205897 A1* | 7/2017 | Chun | G06F 3/03 |
| 2019/0222890 A1* | 7/2019 | Golan | H04N 21/472 |
| 2020/0264703 A1* | 8/2020 | Leake | G06F 3/016 |
| 2020/0274850 A1* | 8/2020 | Baum | H04L 12/283 |

OTHER PUBLICATIONS

"Control your home with mobile app," Cairos Automation, accessed Jul. 2, 2019, 2 pages, <https://www.cairos.in/home-automation>.

"Home Automation," BuildTrack, accessed Jul. 2, 2019, 4 pages, <https://www.buildtrack.in/>.

"Tutorial: Build a Simple VR Unity Game," Oculus Developer, accessed Jul. 1, 2019, 4 pages. <https://developer.oculus.com/documentation/unity/1.9/concepts/unity-tutorial-rollaball-intro/>.

Borodulkin et al., "3D Virtual Smart Home User Interface," International Symposium on Virtual and Intelligent Measurement Systems VIMS2002, May 18-20, 2002, 5 pages, <https://www.researchgate.net/publication/3952317_3D_virtual_smart_home_user_interface>.

Han et al., "User-Friendly Home Automation Based on 3D Virtual World," IEEE Transactions on Consumer Electronics, vol. 56, Issue 3, Aug. 2010, pp. 1843-1847. <https://ieeexplore.ieee.org/abstract/document/5606335>.

Krishnan et al., "Virtual Reality Implementation in Home Automation," International Journal of Scientific & Engineering Research, vol. 9, Issue 2, Feb. 2018, pp. 420-422. <https://www.ijser.org/researchpaper/VIRTUAL-REALITY-IMPLEMENTATION-IN-HOME-AUTOMATION.pdf>.

"Way One Technologies," Way One, accessed Sep. 12, 2019, 11 pages, <https://wayone.in/>.

* cited by examiner

VIRTUAL REALITY BASED SELECTIVE AUTOMATION ADOPTION

BACKGROUND

Automation systems can be used in home and office environments to enable the automation of various tasks for one or more users. Typically, the automation systems are either explicitly programmed or learn from historical use of the automation system by the user.

SUMMARY

Aspects of the disclosure can include a computer-implemented method, computer program product, and system for selectively adopting automation based using virtual reality. One example of the computer-implemented method comprises analyzing data received from an automation control device to identify a plurality of automation devices communicatively coupled to the automation control device; determining a functionality of at least one of the plurality of automation devices not utilized by the user; presenting a gamification scenario associated with the determined functionality to a user in a virtual reality environment; monitoring interaction of the user with the gamification scenario; and enabling use of the determined functionality based on the monitored interaction of the user with the gamification scenario.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
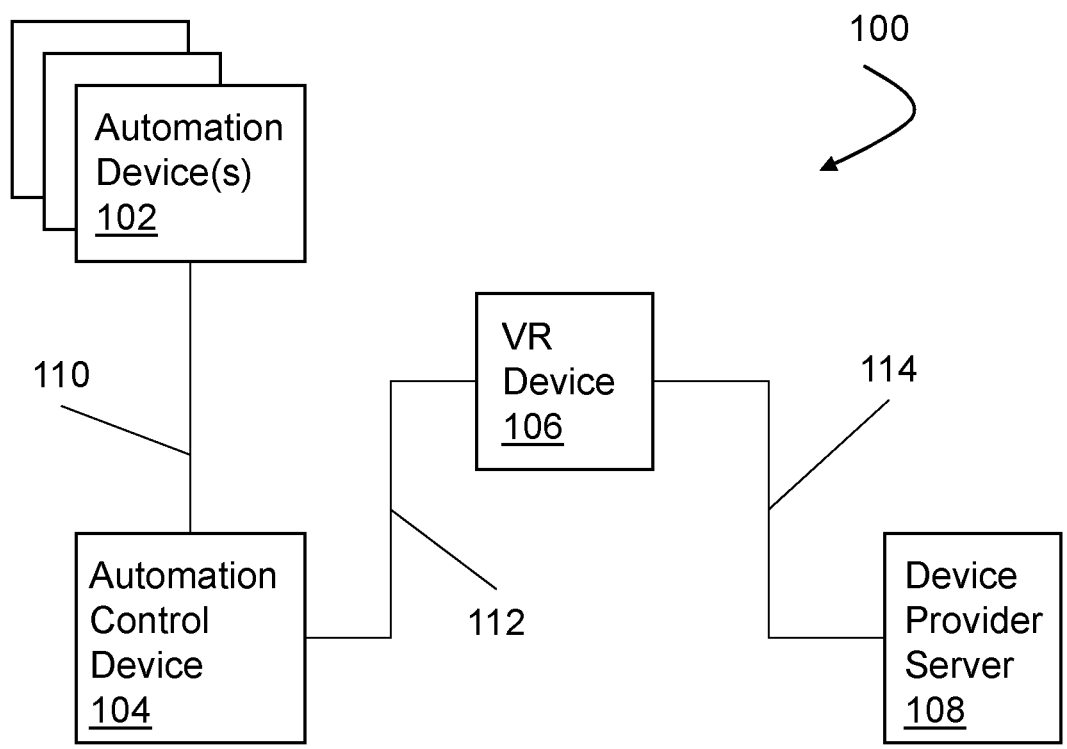
FIG. 1 is a high-level block diagram of one embodiment of an example system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high-level block diagram of one embodiment of an example system 100. The system 100 includes one or more automation devices 102, an automation control device 104, a virtual reality (VR) device 106, and device provider server 108. The automation devices 102 are communicatively coupled to the automation control device 104 via link 110. The VR device 106 is communicatively coupled to the automation control device 104 via link 112 and to the device provider server 108 via link 114. The links 110, 112, and 114 can be implemented using any number of any suitable physical and/or logical communications topologies and can include a variety of types of physical communication channels or "links." For example, the links can be wired (e.g., twisted pair, fiber optic cable, coaxial cable, and/or any other suitable media) and/or wireless (e.g. cellular, Wi-Fi, Bluetooth, etc.). Additionally, the links 110, 112, and/or 114 can be part of a private network (e.g., a network with a firewall that blocks non-authorized external access). Alternatively, or additionally, the links 110, 112, and/or 114 can be part of or connected to a public network, such as the Internet. Thus, links 110, 112, and/or 114 may form part of or be connected to a packet-based network, such as a local area network, a wide-area network, and/or a global network such as the Internet. Furthermore, links 110, 112, and 114 can be implemented differently. For example, in some embodiments link 110 is a local wired connection, link 112 is a local wireless connection, and link 114 is a connect to or part of the Internet.

The automation devices 102 can include both sensors and actuator devices. Sensors, as used herein, are devices which collect data. For example, sensors can include, but are not limited to, cameras to collect video and/or still images, thermometers to measure temperature, pressure sensors to detect pressure, ambient light sensors to measure light levels, microphones to record audio, etc. It is to be understood that one or more of the automation devices 102 can be implemented as Internet of Things (IoT) devices. Actuator devices, as used herein, are devices which perform an action. For example, actuator devices can include, but are not limited to, switches to turn on a device, motors to move an object (such as to open/close a window or blinds), etc. Thus, actuator devices can be used to turn on/off televisions, lights, ovens, alarm systems, etc. Actuator devices can also be used to provide alerts via speakers or lights, lock doors, close blinds, etc. The specific actions which can be performed will vary based on the implementation and actuator devices included.

The sensors collect data to trigger operation of the actuator devices and to provide data for training the automation control device 104. In particular, the automation control device 104 is configured to learn a user's preferences in given situations and to control the actuation devices to perform the desired action. For example, the sensors can capture actions of a user turning off a television set and closing blinds before going to bed. Based on this historical data, the automation control device 104 is configured to learn this desired preference of the user. The automation control device 104 is then configured to continue monitoring actions of the user based on data collected from sensors. If the automation control device 104 determines that the user has gone to bed without turning off the television or closing blinds, the automation control device 104 is configured to output commands to actuation devices to perform the functions of turning off the television and closing the blinds.

However, the above behavior of the system 100 is limited to observation of user actions in historical scenarios or to explicit programming of the automation control device 104, such as a user inputting a desired temperature of the home at given times of the day. The actuation devices 102 either alone or in combination can possess additional functionality not being used by the user as the scenario corresponding to that functionality has not been encountered and/or considered by the user. Thus, the first time the scenario occurs for a given functionality not previous used, the automation control device 104 may not know how to respond to the scenario. In the embodiments described herein, however, the VR device 106 enables the automation control device 104 to learn a user's desired response prior to the user encountering a corresponding scenario and/or prior to the user being aware of the additional functionality.

The virtual reality device 106 is communicatively coupled with the automation control device 104 via link 112 and with the device provider server 108 via link 114, as discussed above. The VR device 106 communicates with the automation control device 104 to obtain information related to the automation devices 102. Based on the information received from the automation control device 104, the VR device 106 identifies the automation devices 102 present in the environment (e.g. home or office) or connected to the automation control device 104. Additionally, the VR device 106 determines which functions of the automation devices 102 have been used based on the information received from the automation control device 104.

The device provider server 108 is a server of the provider of the automation devices 102. In some embodiments, there is a single provider or manufacturer of the automation devices 102. In other embodiments, there are multiple providers or manufacturers of the different automation devices 102 coupled to the automation control device 104. Thus, in some embodiments, there is more than one device provider server 108. The VR device 106 communicates with the device provider server 108 to obtain information regarding the functions which can be performed by the automation devices 102 identified by the VR device 106. The VR device 106 compares the information regarding the functions which can be performed by the automation devices 102, either alone or together, with the functions which have been or are being used based on the data received from the automation control device 104. Based on the comparison, the VR device 106 identifies additional functionality which is not being utilized. The VR device 106 communicates with the device provider server 108 to obtain one or more gamification scenarios related to the additional functionality which is not being utilized.

The gamification scenarios are scenarios presented via the VR device 106 like a virtual reality game. The gamification scenarios enable the user to interact with the home or office environment similar to the way in which a user can interact with a game played on the VR device 106. For example, a gamification scenario can present the user with a scenario in which the user is at home and needs to perform various activities, such as, but not limited to, cooking, cleaning, or interacting with home entertainment devices. In particular, the gamification scenarios obtained from the device provider server 108 include situations for which the automation devices 102 have additional functionality which is not currently being utilized by the user. The VR device 106 communicates the user's actions during the gamification scenarios to the automation control device 104 which enables the automation control device 104 to learn the user's preferences for a given scenario prior to the user encountering that scenario in real life (e.g. a user's preferred volume for television shows vs video games, a user's preference for timing of pre-heating an oven, etc.). In this way, the VR device 106 enables the automation control device 104 to proactively learn through the gamification scenarios rather than waiting for sufficient historical usage data to be obtained.

Figure 2:
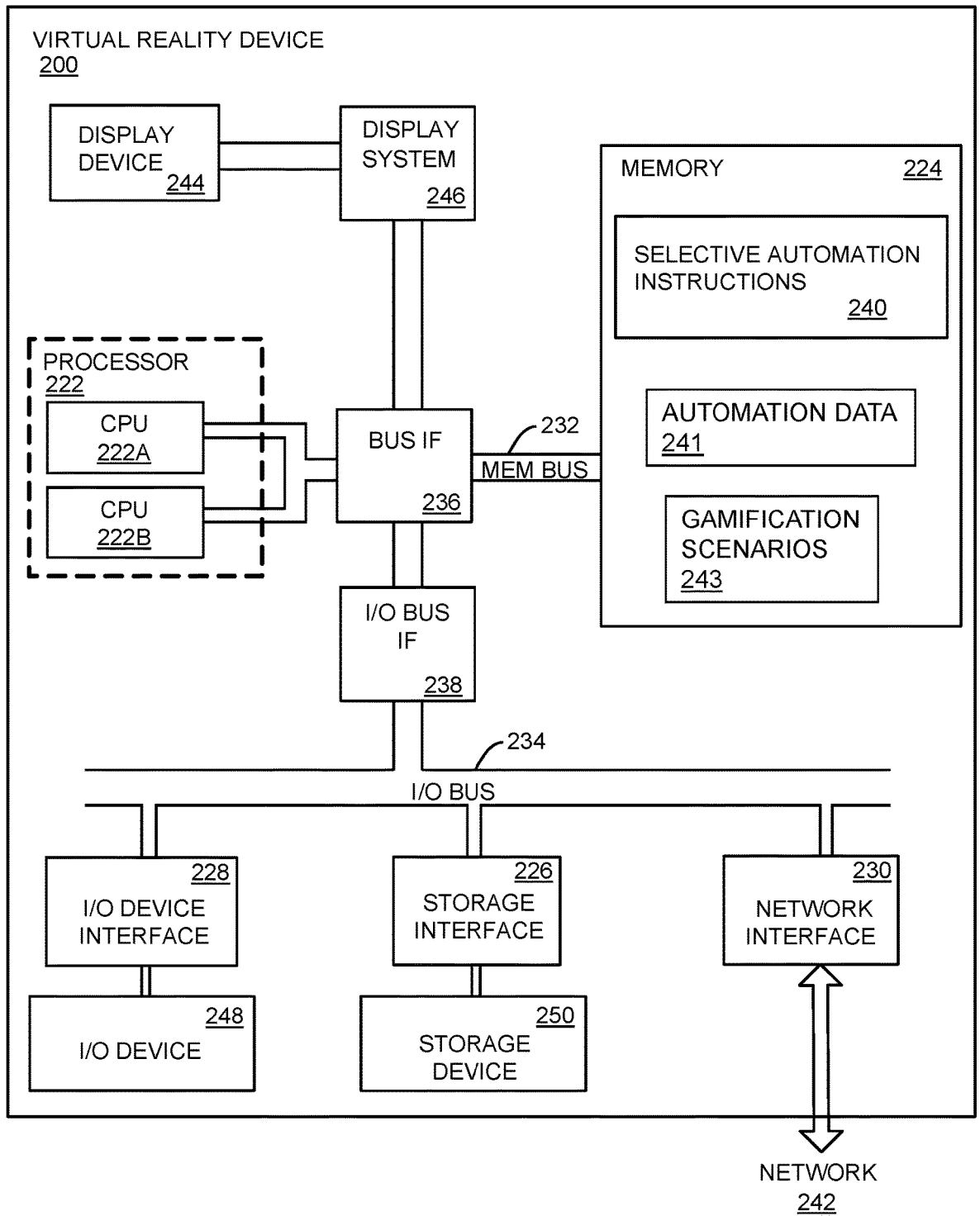
FIG. 2 is a high-level block diagram of one embodiment of an example VR device.

FIG. 2 is a high-level block diagram of one embodiment of an example VR device 200 which can be implemented as the VR device 106 in FIG. 1. The components of the VR device 200 shown in FIG. 2 include one or more processors 222, a memory 224, a storage interface 226, an Input/Output ("I/O") device interface 228, and a network interface 230, all of which are communicatively coupled, directly or indirectly, for inter-component communication via a memory bus 232, an I/O bus 234, bus interface unit ("IF") 236, and an I/O bus interface unit 238.

In the embodiment shown in FIG. 2, the VR device 200 also includes one or more general-purpose programmable central processing units (CPUs) 222A and 222B, herein generically referred to as the processor 222. In some embodiments, the VR device 200 contains multiple processors. However, in other embodiments, the VR device 200 is a single CPU system. Each processor 222 executes instructions stored in the memory 224.

In some embodiments, the memory 224 includes a random-access semiconductor memory, storage device, or storage medium (either volatile or non-volatile) for storing or encoding data and programs. For example, the memory 224 may store selective automation instructions 240, automation data 241, and gamification scenarios 243. In some embodiments, the memory 224 represents the entire virtual memory of the VR device 200 and may also include the virtual memory of other computer systems coupled directly to the VR device 200 or connected via a network 242. In some embodiments, the memory 224 is a single monolithic entity, but in other embodiments, the memory 224 includes a hierarchy of caches and other memory devices. For example, the memory 224 can exist in multiple levels of caches, and these caches may be further divided by function, so that one cache holds instructions while another holds non-instruction data, which is used by the processor. The memory 224 may be further distributed and associated with different CPUs or sets of CPUs, as is known in any various so-called non-uniform memory access (NUMA) computer architectures, for example.

Hence, although the selective automation instructions 240, automation data 241, and gamification scenarios are stored on the memory 224 in the example shown in FIG. 2 for purposes of explanation, it is to be understood that other embodiments can be implemented differently. For example, the selective automation instructions 240, automation data 241, and/or gamification scenarios 243 can be distributed across multiple physical media in some embodiments.

Furthermore, in some embodiments, the selective automation instructions 240 are executed by the same processor 222. However, in other embodiments, execution of the selective automation instructions 240 are distributed across multiple processors located in the same or different computer systems. For example, in some such embodiments, at least a portion of the instructions and data structures associated with the selective automation instructions 240 can be on different computer systems and accessed remotely, e.g., via a network 242. The VR device 200 can use virtual addressing mechanisms that allow the programs of the VR device 200 to behave as if they only have access to a large, single storage entity instead of access to multiple, smaller storage entities. Thus, the memory 224 can store all or a portion of the various programs, modules, and data structures for performing the risk assessment functionality, as discussed herein.

The VR device 200 in the embodiment shown in FIG. 2 also includes a bus interface unit 236 to handle communications among the processor 222, the memory 224, the display system 246, and the I/O bus interface unit 238. The I/O bus interface unit 238 is coupled with the I/O bus 234 for transferring data to and from the various I/O units. In particular, the I/O bus interface unit 238 can communicate with multiple I/O interface units 228, 226, and 230, which are also known as I/O processors (IOPs) or I/O adapters (IOAs), through the I/O bus 234. The display system 246 includes a display controller, a display memory, or both. The display controller can provide video, audio, or both types of data to a display device 244 to present a virtual reality environment to a user, as known to one of skill in the art. The display memory may be a dedicated memory for buffering video data. In some embodiments, the display device 244 also includes one or more speakers for rendering audio. Alternatively, one or more speakers for rendering audio may be coupled with an I/O interface unit. In alternate embodiments, one or more functions provided by the display system 246 are on board an integrated circuit that also includes the processor 222. In addition, in some embodiments, one or more of the functions provided by the bus interface unit 126 is on board an integrated circuit that also includes the processor 222.

The I/O interface units support communication with a variety of storage and I/O devices. For example, the I/O device interface unit 228 supports the attachment of one or more user I/O devices 248, which may include user output devices and user input devices. A user can manipulate the user input devices 248 using a user interface, in order to provide input data and commands to the user I/O device 248 and the VR device 200. Additionally, a user can receive output data via the user output devices. For example, a user interface may be presented via the user I/O device 248, such as displayed on a display device, played via a speaker, or vibrations via a haptic device.

The storage interface 226 supports the attachment of one or more disk drives or direct access storage devices 250 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 250 is implemented via any type of secondary storage device. The contents of the memory 224, or any portion thereof, may be stored to and retrieved from the storage device 250 as needed. The network interface 230 provides one or more communication paths from the VR device 200 to other digital devices and computer systems. For example, the network interface 230 can communicatively couple the computer system to other devices and systems via a wide area network such as the internet.

In operation, the processor 222 is configured to execute the selective automation instructions 240. For example, the selective automation instructions 240 are configured, in some embodiments, to cause the processor 222 to cause the processor 222 to receive automation data 241 from an automation control device, such as automation control device 104, via the network interface 230. The automation data 241 can include, but is not limited to, data regarding the automation devices, such as automation devices 102, connected to the automation control device. The data regarding the automation devices can include, but is not limited to, the manufacturer of, model number, and usage history for each automation device. The automation data 241 can also include other data related to automation, such as user preferences for automating tasks.

The selective automation instructions 240 are further configured to cause the processor 222 to communicate with a server of each device's provider, such as device provider server 108, to obtain information regarding available functionality of the device. Thus, the automation data 241 stored in memory 224 can include data regarding available functionality of automation devices obtained from the device provider server. The selective automation instructions 240 further cause the processor 222 to compare the information received from the device provider server with the data received from the automation control device to identify functionality which is not being utilized by the user, as discussed herein.

The selective automation instructions 240 further cause the processor 222 to retrieve gamification scenarios from the device provider server based on the identified functionality that is not being utilized. In particular, the processor 222 retrieves one or more gamification scenarios related to the functionality not being utilized. The processor 222 then causes the gamification scenarios to be presented to a user via the display device 244. In some embodiments, the processor 222 can present the gamification scenarios in response to received user input requesting the gamification scenarios. In other embodiments, the processor 222 can prompt the user through notifications to participate in the gamification scenarios. The selective automation instructions 240 cause the processor 222 to monitor the user interaction with the gamification scenarios and provide data regarding the monitored user interaction to the automation control device to enable the automation control device to learn based on the user interaction with the gamification scenarios, as discussed above.

Figure 3:
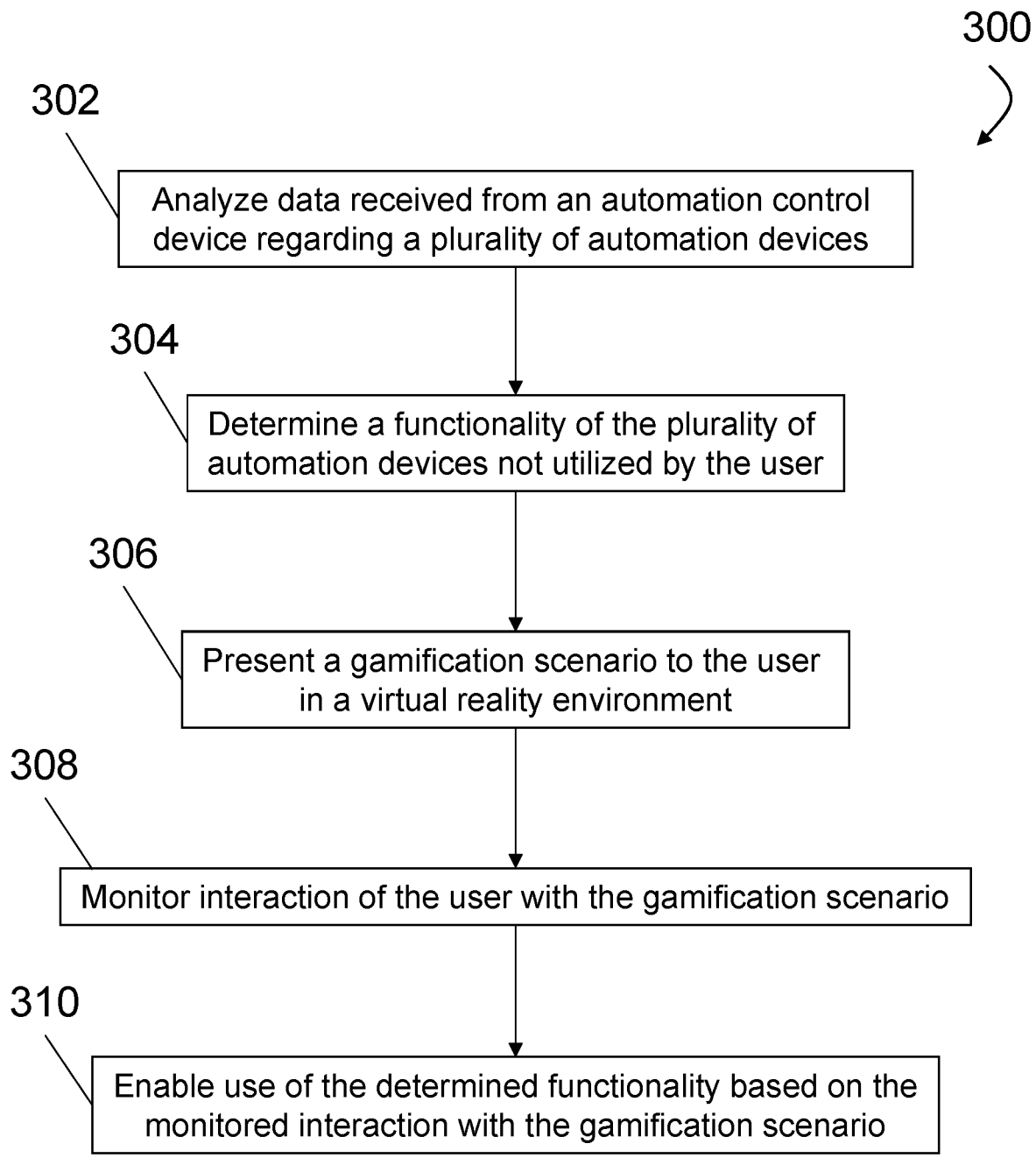
FIG. 3 is a flow chart depicting one embodiment of an example method of selectively adopting automation functionality using virtual reality.

FIG. 3 is a flow chart depicting one embodiment of an example method 300 of selectively adopting automation functionality based on virtual reality experience. Method 300 can be implemented by a virtual reality device, such as VR device 106 OR 200, discussed above. For example, the method 300 can be implemented by a CPU, such as CPU 222 in virtual reality device 200, executing instructions, such as selective automation instructions 240. It is to be understood that the order of actions in example method 300 is provided for purposes of explanation and that the method can be performed in a different order in other embodiments. Similarly, it is to be understood that some actions can be omitted or additional actions can be included in other embodiments.

At block 302, data received from an automation control device, such as automation control device 104, is analyzed to identify a plurality of automation devices communicatively coupled to the automation control device. As discussed above, the data received from the automation control device can include, in some embodiments, a manufacturer, model number, etc. of each automation device communicatively coupled to the automation control device. Additionally, in some embodiments, the data received from the automation control device can include historical use data of the automation devices.

At block 304, a functionality of at least one of the plurality of automation devices that is not utilized by the user is identified. For example, in some embodiments, the functionality not being utilized is a functionality enabled by two or more automation devices working together. In other embodiments, the functionality not being utilized is a functionality of a single automation device. Additionally, in some embodiments, determining the functionality not being utilized includes retrieving functionality data for each of the automation devices from a device provider server and identifying one or more historical uses of by the user of the plurality of automation devices based on the data received from the automation control device. In such embodiments, the VR device compares the one or more historical uses of the plurality of automation devices with the functionality data to determine which functionality is available but not being utilized by the user.

In other embodiments, determining the functionality not being utilized includes retrieving functionality data for each of the automation devices from a device provider server and comparing the functionality data to a user profile of the user containing user preferences. The VR device then identifies differences between the user preferences and the functionality of the automation devices to identify functionality not utilized by the user. For example, a user may temporarily stay at a hotel, a dorm, etc. that has some automation functionality, but the automation functionality may be different from the automation functionality of the user's home. Thus, the user's preferences for given situations may not match or can't be satisfied by the automation functionality of the temporary residence. Thus, the VR device can compare the available functionality of the temporary residence to the preferences of the user in the user profile to identify functionality or work flow which can be modified to approximate the user's preferences. Additionally, the VR device may identify functionality of the temporary residence which is not available in the user's home. In both cases, the identified functionality is not functionality which has been utilized by the user in the past.

At block 306, a gamification scenario associated with the determined unutilized functionality is presented to the user in a virtual reality environment. In particular, as discussed above, the gamification scenario enables the user to interact with a scenario in which the automation devices can provide the unutilized functionality in order to learn the user's preferences for the given scenario. In some embodiments, presenting the gamification scenario includes retrieving the gamification scenario from a device provider server. In other embodiments, the VR device is configured to generate the gamification scenario. Additionally, in some embodiments, the VR device is configured to modify a retrieved gamification scenario or generate the gamification scenario based on a user's age in the user's profile (e.g. to adapt the scenario for a child, a youth, an adult, an elderly individual).

At block 308, interaction of the user with the gamification scenario is monitored. For example, the user can be presented scenarios involving cooking with different applications, interacting with home entertainment devices, etc. The scenarios are presented in a way to enable the user to identify and/or use the previously unutilized functionality. In other words, the gamification scenario creates and presents a virtual need for the user that is related to the determined functionality in order to monitor how the user interacts with the virtual need to learn the user's preferences regarding the determined functionality. For example, a virtual need can be preparing meals without certain ingredients, such as oil, based on an illness even though the user is not currently sick. The gamification scenario can present a situation in which the user is able to prepare a meal, which typically requires frying in oil, without using oil by identifying functionality of other appliances to prepare the meal without frying. It is to be understood that other virtual needs can be created in other embodiments and that the above is presented by way of example only for purposes of explanation.

At block 310, use of the determined functionality which was previously unutilized is enabled based on the monitored interaction of the user with the gamification scenario. Thus, prior to the user encountering various scenarios or the user being required to identify all available functions of the automation devices, the VR device is able to work with the automation control device to train the automation control device based on interactions in a virtual reality environment. This can include updating a profile of the user based on observed interactions of the user, for example. Thus, the automation control device is trained based on virtual experiences in a virtual reality environment rather than on actual historical use of the automation devices. Furthermore, as described above, the gamification scenarios can be used to help a user realize additional functionality which can be automated and a need for that automation so that the user can adopt that automation. The IoT and sensor-based system discussed herein can analyze the user's need and create a gamification scenario to help the user identify the need of automation.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
analyzing data received from an automation control device to identify a plurality of automation devices communicatively coupled to the automation control device;
determining a functionality of at least one of the plurality of automation devices not utilized by a user and available to the user;
presenting a gamification scenario associated with the determined functionality to the user in a virtual reality environment, wherein the virtual reality environment provides haptic feedback to the user, and the gamification scenario is configured to show the user how to identify and use the determined functionality;
monitoring interaction of the user with the gamification scenario; and
enabling use of the determined functionality based on the monitored interaction of the user with the gamification scenario.

2. The method of claim 1, wherein determining the functionality not utilized by the user comprises:
retrieving functionality data for each of the automation devices from a device provider server;
identifying one or more historical uses by the user of the plurality of automation devices based on the data received form the automation control device; and
comparing the one or more historical uses of the plurality of automation devices with the functionality data for each of the automation devices to determine the functionality not utilized by the user.

3. The method of claim 1, wherein presenting the gamification scenario includes retrieving the gamification scenario from a device provider server for the at least one automation device.

4. The method of claim 1, wherein the determined functionality is a functionality enabled by two or more of the plurality of automation devices together.

5. The method of claim 1, wherein enabling use of the determined functionality comprises communicating with the automation control device to update a profile associated with the user based on the monitored interaction of the user with the gamification scenario.

6. The method of claim 1, wherein determining the functionality not utilized by the user comprises:
retrieving functionality data for each of the automation devices from a device provider server;
comparing the functionality data to a user profile of the user containing user preferences; and
identifying differences between the user preferences and the functionality data based on the comparison to identify the functionality not utilized by the user.

7. The method of claim 1, wherein presenting the gamification scenario includes generating the gamification scenario based on the determined functionality and on an age of the user indicated in a user profile of the user.

8. A virtual reality device comprising:
a display device configured to present a virtual reality environment to a user;
an interface; and
a processor communicatively coupled to the interface and the display device, wherein the processor is configured to:
analyze data received from an automation control device via the interface to identify a plurality of automation devices communicatively coupled to the automation control device;
determine a functionality of at least one of the plurality of automation devices not utilized by a user and available to the user;
present a gamification scenario associated with the determined functionality to the user in a virtual reality environment displayed in the display device, wherein the virtual reality environment provides haptic feedback to the user, and the gamification scenario is configured to show the user to identify and use the determined functionality;
monitoring interaction of the user with the gamification scenario; and
enable use of the determined functionality based on the monitored interaction of the user with the gamification scenario.

9. The virtual reality device of claim 8, wherein the processor is configured to determine the functionality not utilized by the user by:
retrieving functionality data for each of the automation devices from a device provider server via the interface;
identifying one or more historical uses by the user of the plurality of automation devices based on the data received form the automation control device; and
comparing the one or more historical uses of the plurality of automation devices with the functionality data for each of the automation devices to determine the functionality not utilized by the user.

10. The virtual reality device of claim 8, wherein the processor is configured to retrieve the gamification scenario from a device provider server via the interface for the at least one automation device.

11. The virtual reality device of claim 8, wherein the determined functionality is a functionality enabled by two or more of the plurality of automation devices together.

12. The virtual reality device of claim 8, wherein the processor is configured to enable use of the determined functionality by communicating with the automation control device to update a profile associated with the user based on the monitored interaction of the user with the gamification scenario.

13. The virtual reality device of claim 8, wherein the processor is configured to determine the functionality not utilized by the user by:
retrieving functionality data for each of the automation devices from a device provider server via the interface;
comparing the functionality data to a user profile of the user containing user preferences; and
identifying differences between the user preferences and the functionality data based on the comparison to identify the functionality not utilized by the user.

14. The virtual reality device of claim 8, wherein the processor is configured to generate the gamification scenario based on the determined functionality and on an age of the user indicated in a user profile of the user.

15. A computer program product comprising a computer readable storage medium having a computer readable program stored therein, wherein the computer readable program, when executed by a processor, causes the processor to:
analyze data received from an automation control device via the interface to identify a plurality of automation devices communicatively coupled to the automation control device;
determine a functionality of at least one of the plurality of automation devices not utilized by a user, and available to the user;
present a gamification scenario associated with the determined functionality to a user in the virtual reality environment displayed in the display device, wherein the virtual reality environment provides haptic feedback to the user, and the gamification scenario is configured to show the user to identify and use the determined functionality;
monitoring interaction of the user with the gamification scenario; and
enable use of the determined functionality based on the monitored interaction of the user with the gamification scenario.

16. The computer program product of claim 15, wherein the program instructions are further configured to cause the processor to determine the functionality not utilized by the user by:
retrieving functionality data for each of the automation devices from a device provider server via the interface;
identifying one or more historical uses by the user of the plurality of automation devices based on the data received form the automation control device; and
comparing the one or more historical uses of the plurality of automation devices with the functionality data for each of the automation devices to determine the functionality not utilized by the user.

17. The computer program product of claim 15, wherein the program instructions are further configured to cause the processor to retrieve the gamification scenario from a device provider server via the interface for the at least one automation device.

18. The computer program product of claim 15, wherein the program instructions are further configured to cause the processor to enable use of the determined functionality by communicating with the automation control device to update a profile associated with the user based on the monitored interaction of the user with the gamification scenario.

19. The computer program product of claim 15, wherein the program instructions are further configured to cause the processor to determine the functionality not utilized by the user by:
retrieving functionality data for each of the automation devices from a device provider server via the interface;
comparing the functionality data to a user profile of the user containing user preferences; and
identifying differences between the user preferences and the functionality data based on the comparison to identify the functionality not utilized by the user.

20. The computer program product of claim 15, wherein the program instructions are further configured to cause the processor to generate the gamification scenario based on the determined functionality and on an age of the user indicated in a user profile of the user.

* * * * *